(12) United States Patent
Yin et al.

(10) Patent No.: US 11,108,870 B2
(45) Date of Patent: Aug. 31, 2021

(54) RESOURCE ACQUIRING METHOD AND APPARATUS

(71) Applicant: Huawei Technologies Co., Ltd., Shenzhen (CN)

(72) Inventors: Jiaxin Yin, Nanjing (CN); Ying Gao, Nanjing (CN); Jiaming Wu, Shenzhen (CN); Yongjing Zhang, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 156 days.

(21) Appl. No.: 15/997,173

(22) Filed: Jun. 4, 2018

(65) Prior Publication Data
US 2018/0288170 A1 Oct. 4, 2018

Related U.S. Application Data

(63) Continuation of application No. PCT/CN2016/111101, filed on Dec. 20, 2016.

(30) Foreign Application Priority Data

Dec. 31, 2015 (CN) .......................... 201511030526.5

(51) Int. Cl.
*G06F 15/173* (2006.01)
*H04L 29/08* (2006.01)
(Continued)

(52) U.S. Cl.
CPC .............. *H04L 67/16* (2013.01); *H04L 67/12* (2013.01); *H04L 67/2842* (2013.01); *H04W 4/00* (2013.01); *H04W 4/70* (2018.02)

(58) Field of Classification Search
CPC ..... H04L 67/16; H04L 67/12; H04L 67/2842; H04W 4/70; H04W 4/00
(Continued)

(56) References Cited

U.S. PATENT DOCUMENTS 10,534,660 B2 * 1/2020 Xu ...................... G06F 11/0709
2006/0271384 A1 11/2006 Munson et al.
(Continued)

FOREIGN PATENT DOCUMENTS

CN 101938525 A 1/2011
CN 101983496 A 3/2011
(Continued)

OTHER PUBLICATIONS

Foreign Communication From A Counterpart Application, European Application No. 16881030.7, Extended European Search Report dated Oct. 9, 2018, 8 pages.
(Continued)

*Primary Examiner* — Alan S Chou
(74) *Attorney, Agent, or Firm* — Conley Rose, P.C.

(57) ABSTRACT

A resource acquiring method relates to the field of machine-to-machine communications (M2M) technologies, where the method is used by a consumer application to acquire a producer data resource generated by a producer application, and includes receiving a request message that is used to acquire the producer data resource and that is sent by the consumer application, where the request message carries indication information that is used to instruct to update the producer data resource and return an updated producer data resource, acquiring current moment data from the producer application, updating the producer data resource using the current moment data, and returning the updated producer data resource to the consumer application. Hence, a problem of mismatching between data generated by the producer application and data used by the consumer application is resolved.

20 Claims, 4 Drawing Sheets

(51) Int. Cl.
*H04W 4/00* (2018.01)
*H04W 4/70* (2018.01)

(58) Field of Classification Search
USPC .......................................................... 709/223
See application file for complete search history.

(56) References Cited

U.S. PATENT DOCUMENTS

| | | | |
|---|---|---|---|
| 2009/0196218 A1 | 8/2009 | Pulini et al. | |
| 2012/0317228 A1 | 12/2012 | Bohrer et al. | |
| 2013/0122854 A1 | 5/2013 | Agarwal et al. | |
| 2013/0198340 A1* | 8/2013 | Ukkola | H04L 67/02 709/219 |
| 2013/0346504 A1* | 12/2013 | Huang | H04L 41/0853 709/204 |
| 2014/0066047 A1 | 3/2014 | Qiang | |
| 2014/0089666 A1* | 3/2014 | Kim | H04L 9/12 713/170 |
| 2014/0280581 A1* | 9/2014 | Hernandez | H04L 29/08072 709/204 |
| 2014/0298037 A1 | 10/2014 | Xiao et al. | |
| 2014/0359133 A1 | 12/2014 | Tian et al. | |
| 2014/0369251 A1* | 12/2014 | Zhang | H04W 4/08 370/312 |
| 2015/0055557 A1* | 2/2015 | Dong | H04W 4/70 370/328 |
| 2016/0219125 A1 | 7/2016 | Xiao | |
| 2016/0234691 A1 | 8/2016 | Jeong et al. | |
| 2016/0337354 A1* | 11/2016 | Smadja | H04W 4/70 |
| 2017/0006490 A1 | 1/2017 | Shen et al. | |
| 2017/0093700 A1* | 3/2017 | Gilley | H04L 45/44 |
| 2017/0311303 A1* | 10/2017 | Ahn | H04W 72/0406 |

FOREIGN PATENT DOCUMENTS

| | | |
|---|---|---|
| CN | 102111449 A | 6/2011 |
| CN | 102523580 A | 6/2012 |
| CN | 103020841 A | 4/2013 |
| CN | 103138965 A | 6/2013 |
| CN | 103227803 A | 7/2013 |
| CN | 103618800 A | 3/2014 |
| CN | 103906206 A | 7/2014 |
| CN | 104462235 A | 3/2015 |
| CN | 105049512 A | 11/2015 |
| WO | 2014182706 A1 | 11/2014 |
| WO | 2015031750 A1 | 3/2015 |
| WO | 2015069038 A1 | 5/2015 |
| WO | 2015081786 A1 | 6/2015 |
| WO | 2015174916 A1 | 11/2015 |

OTHER PUBLICATIONS

Machine Translation and Abstract of Chinese Publication No. CN101938525, Jan. 5, 2011, 26 pages.
Machine Translation and Abstract of Chinese Publication No. CN101983496, Mar. 2, 2011, 13 pages.
Machine Translation and Abstract of Chinese Publication No. CN103618800, Mar. 5, 2014, 29 pages.
Machine Translation and Abstract of Chinese Publication No. CN104462235, Mar. 25, 2015, 15 pages.
Foreign Communication From a Counterpart Application, Chinese Application No. 201511030526.5, Chinese Office Action dated Jul. 18, 2019, 8 pgaes.
Machine Translation and Abstract of Chinese Publication No. CN102111449, Jun. 29, 2011, 8 pages.
Machine Translation and Abstract of Chinese Publication No. CN102523580, Jun. 27, 2012, 7 pages.
Machine Translation and Abstract of Chinese Publication No. CN103138965, Jun. 5, 2013, 10 pages.
Machine Translation and Abstract of Chinese Publication No. CN105049512, Nov. 11, 2015, 9 pages.
"Functional Architecture," ONEM2M Technical Specification, TS-0001-V2.5.0, Nov. 29, 2015, 376 pages.
Foreign Communication From A Counterpart Application, PCT Application No. PCT/CN2016/111101, English Translation of International Search Report dated Mar. 24, 2017, 3 pages.
Foreign Communication From A Counterpart Application, PCT Application No. PCT/CN2016/111101, English Translation of Written Opinion dated Mar. 24, 2017, 5 pages.
Foreign Communication From A Counterpart Application, Japanese Application No. 2018-533615, Japanese Office Action dated Jul. 1, 2019, 3 pages.
Foreign Communication From A Counterpart Application, Japanese Application No. 2018-533615, English Translation of Japanese Office Action dated Jul. 1, 2019, 3 pages.
Foreign Communication From A Counterpart Application, Japanese Application No. 2018-533615, Japanese Notice of Allowance dated Oct. 28, 2019, 3 pages.

* cited by examiner

RESOURCE ACQUIRING METHOD AND APPARATUS

CROSS-REFERENCE TO RELATED APPLICATIONS

This application is a continuation of International Patent Application No. PCT/CN2016/111101 filed on Dec. 20, 2016, which claims priority to Chinese Patent Application No. 201511030526.5 filed on Dec. 31, 2015. The disclosures of the aforementioned applications are hereby incorporated by reference in their entireties.

TECHNICAL FIELD

The present disclosure relates to the field of machine-to-machine communications (M2M) technologies, and in particular, to a resource acquiring method and an apparatus.

BACKGROUND

M2M is a networked application and service taking intelligent interaction between machines as the core. The M2M implements data communication without manual intervention by inserting a wireless or wired communications module and an application processing logic in a machine in order to satisfy informatization requirements of users in aspects such as monitoring, scheduling command, data collection, and measurement.

In the M2M, a scenario in which an application needs to read a value generated by another application is usually encountered. For example, a temperature sensor is deployed in a public area such as a city hall or a park, and continuously reports a collected temperature value to an M2M platform, and the temperature value is stored in the M2M platform in a resource form (briefly referred to as a temperature resource below). A resource is encapsulation for information in a Representational State Transfer (REST) architecture (RESTful architecture), and may be a text stored in a magnetic disk or a data record in a database. The resource includes data itself, metadata of the data, a data presentation method, and the like. In this scenario, a visitor intending to go to a park may read, using a web page or a mobile phone client, the temperature value stored in the M2M platform, in a manner of sending an acquiring request to the temperature resource in the M2M platform, and a response to the request carries the temperature value. In such scenario, the sensor is a producer application configured to generate data (that is, temperature value), and report the temperature value to the M2M platform, and the web page or mobile phone client is a consumer application configured to consume data, and read the temperature value in the M2M platform.

In a conventional M2M system, a producer application cannot learn how many consumer applications are interested in data generated by the producer application. Even if no consumer application acquires data, the producer application still continuously sends an update request. On the contrary, a consumer application cannot learn whether updated data is currently stored in the M2M platform. Therefore, even if the producer application does not refresh data, the consumer application still continuously sends an acquiring request, but legacy data is usually acquired.

In some actual deployments, for example, in the scenario mentioned above, the sensor is a limited device, that is, a battery powered sensor, and a central processing unit (CPU) processing capability, memory, and network bandwidth are all limited. It is intended to reduce a quantity of network connection or wake-up times as much as possible, thereby ensuring a longer time of dormancy to prolong an operating time. In a current scenario, a producer application and a consumer application of data do not match between information. Consequently, in a process of acquiring data reported by the producer application, the consumer application continuously encounters redundant message transmission and waste.

SUMMARY

The present disclosure provides a resource acquiring method and an apparatus in order to resolve a problem of mismatching between data generated by a producer application and data used by a consumer application.

To achieve the foregoing objective, the following technical solutions are used in embodiments of the present disclosure.

According to a first aspect, an embodiment of the present disclosure provides a resource acquiring method. The method is used by a consumer application to acquire a producer data resource generated by a producer application, and includes the following steps. A platform receives a request message that is used to acquire the producer data resource and that is sent by the consumer application, where the request message carries indication information that is used to instruct to update the producer data resource and return an updated producer data resource. Different from other approaches, instead of directly acquiring data content in the producer data resource and directly feeding back the data content to the consumer application, the platform acquires current moment data from the producer application, and updates the producer data resource using the current moment data, and then returns the updated producer data resource to the consumer application. According to the method provided in this embodiment of the present disclosure, the producer application updates the producer data resource based on a request of the consumer application for the producer data resource as required in order to prevent the producer application from frequently and unnecessarily updating the producer data resource, and resolve a problem of mismatching between data generated by the producer application and data used by the consumer application. Moreover, the method may ensure that the consumer application may acquire latest data generated by the producer application in order to avoid a case in which when the consumer application acquires data, the data has not been refreshed, and consequently legacy data is acquired.

According to a second aspect, an embodiment of the present disclosure provides a resource acquiring method. The method is used by a consumer application to acquire a producer data resource generated by a producer application, and includes the following steps. A platform receives a request message that is used to acquire the producer data resource and that is sent by the consumer application, where the request message carries an indication message that is used to instruct to return the producer data resource and update the producer data resource, returns the producer data resource to the consumer application, and then acquires current moment data from the producer application, and updates the producer data resource using the current moment data. According to the method provided in this embodiment of the present disclosure, the producer application updates the producer data resource based on a request of the consumer application for the producer data resource as required in order to prevent the producer application from frequently and unnecessarily updating the producer data resource, and resolve a problem of mismatching between data generated by the producer application and data used by the consumer application. Moreover, according to the method, after receiving the request message that is used to acquire the producer data resource and that is sent by the consumer application, the platform acquires current data in data content of the producer data resource, returns the current data to the consumer application, ensuring that the consumer application acquires data in time, and further triggers the producer application to update the producer data resource such that the consumer application may obtain updated data when acquiring data next time.

In a possible design, in the foregoing first aspect or second aspect, before the platform receives the request message that is used to acquire the producer data resource and that is sent by the consumer application, the method further includes the following steps. The platform receives a subscription resource creation request sent by the producer application, where the subscription resource creation request includes an identifier of the producer data resource, an identifier of the producer application, and a trigger condition of a subscription event, and creates a subscription resource based on the subscription resource creation request. The subscription resource of the producer data resource is created on the platform such that when the producer data resource has a preset change, the platform may send a notification message to the producer application in time, where the notification message is used to instruct the producer application to update the producer data resource. Therefore, the producer application learns in time that the consumer application intends to acquire latest data in order to respond to this.

In a possible design, acquiring current moment data from the producer application, and updating the producer data resource using the current moment data may be as follows. The platform performs a preset operation on the producer data resource based on the indication information, determines that the performed preset operation satisfies the trigger condition, sends a notification message to the producer application based on the identifier of the producer application, where the notification message is used to indicate that a consumer application needs to acquire the current moment data, receives the current moment data returned by the producer application, and updates the producer data resource using the current moment data returned by the producer application. When the platform/gateway receives the request message that is used to acquire the producer data resource and that is sent by the consumer application, different from the other approaches, instead of directly acquiring data content in the producer data resource and directly feeding back the data content to the consumer application, the platform/gateway performs the preset operation on the producer data resource to trigger the platform/gateway to send, to the producer application, the notification message for acquiring the latest data. By means of the method in this embodiment of the present disclosure, the producer application may update the producer data resource based on a request of the consumer application for the producer data resource as required in order to prevent the producer application from frequently and unnecessarily updating the producer data resource, and resolve a problem of mismatching between data generated by the producer application and data used by the consumer application.

In a possible design, the trigger condition includes creating a child resource of the producer data resource, and a type of the child resource is a preset type. In a manner of creating a child resource of a particular type of the producer data resource, the platform is triggered to send a notification message to the producer application, instead of performing an operation on the producer data resource itself in order to provide a more flexible and effective trigger mechanism. Optionally, the trigger condition further includes a quantity limitation of the created child resource, and/or a creation time interval limitation of a plurality of child resources.

In another possible design, the child resource includes a result status and request content, and after updating the producer data resource using the current moment data returned by the producer application, the method further includes changing the result status from a to-be-processed state to a successfully processed state, and updating the request content using the current moment data.

According to a third aspect, an embodiment of the present disclosure provides a resource acquiring method. The method is used by a consumer application to acquire a producer data resource generated by a producer application, and includes the following steps. A platform receives a subscription resource creation request sent by the producer application, where the subscription resource creation request includes an identifier of the producer data resource, an identifier of the producer application, and a trigger condition of a subscription event, and creates a subscription resource of the producer data resource based on the subscription resource creation request, receives an operation request sent by the consumer application, performs a preset operation on the producer data resource based on the operation request, determines that the performed preset operation satisfies the trigger condition, sends a notification message to the producer application based on the identifier of the producer application, where the notification message is used to indicate that a consumer application needs to acquire current moment data, receives the current moment data returned by the producer application, and updates the producer data resource using the current moment data returned by the producer application. According to the method provided in this embodiment of the present disclosure, the producer application updates the producer data resource based on a request of the consumer application for the producer data resource as required in order to prevent the producer application from frequently and unnecessarily updating the producer data resource, and resolve a problem of mismatching between data generated by the producer application and data used by the consumer application.

According to a fourth aspect, an embodiment of the present disclosure provides a data resource platform. The data resource platform has a function of implementing platform behaviors in the resource acquiring methods in the first to third aspects. The function may be implemented using hardware, or may be implemented by hardware executing corresponding software. The hardware or software includes one or more modules corresponding to the foregoing function.

In a possible design, a structure of the data resource platform includes a processor and a memory. The memory is configured to store a program supporting a database processing device to perform the foregoing method, and the processor is configured to execute the program stored in the memory. The database processing device may further include a communications interface that is used by the database processing device to communicate with another device or a communications network.

According to a fifth aspect, an embodiment of the present disclosure provides a computer storage medium configured to store a computer software instruction used by the foregoing data resource platform, and the computer storage medium includes a program that is designed for the data resource platform and that is configured to perform the foregoing aspects.

In a possible design, each time a same consumer application sends a request message that is used to acquire a data resource to the platform/gateway, the platform/gateway creates a new child resource of an acquire type. To alleviate processing load of the platform/gateway, the platform/gateway deletes the created resource of the acquire type according to a rule. For example, each resource of the acquire type has a life cycle starting from creation of the resource of the acquire type, and when an existence time of a resource of the acquire type exceeds the life cycle, the platform/gateway deletes the resource of the acquire type, when a result status of a resource of the acquire type is unsuccessfully processed or processed, the platform/gateway deletes the resource of the acquire type, or when an update identifier of a resource of the acquire type is always and a result status is unsuccessfully processed or processed, the platform/gateway deletes the resource of the acquire type.

Compared with the other approaches, the solution provided in the present disclosure can resolve a problem of mismatching between data generated by the producer application and data used by the consumer application.

These aspects or another aspect in the present disclosure is more concise and easily understandable in descriptions in the following embodiments.

DESCRIPTION OF EMBODIMENTS

To make the objectives, technical solutions, and advantages of the present disclosure clearer, the following further describes the embodiments of the present disclosure in detail with reference to the accompanying drawings.

Figure 1:
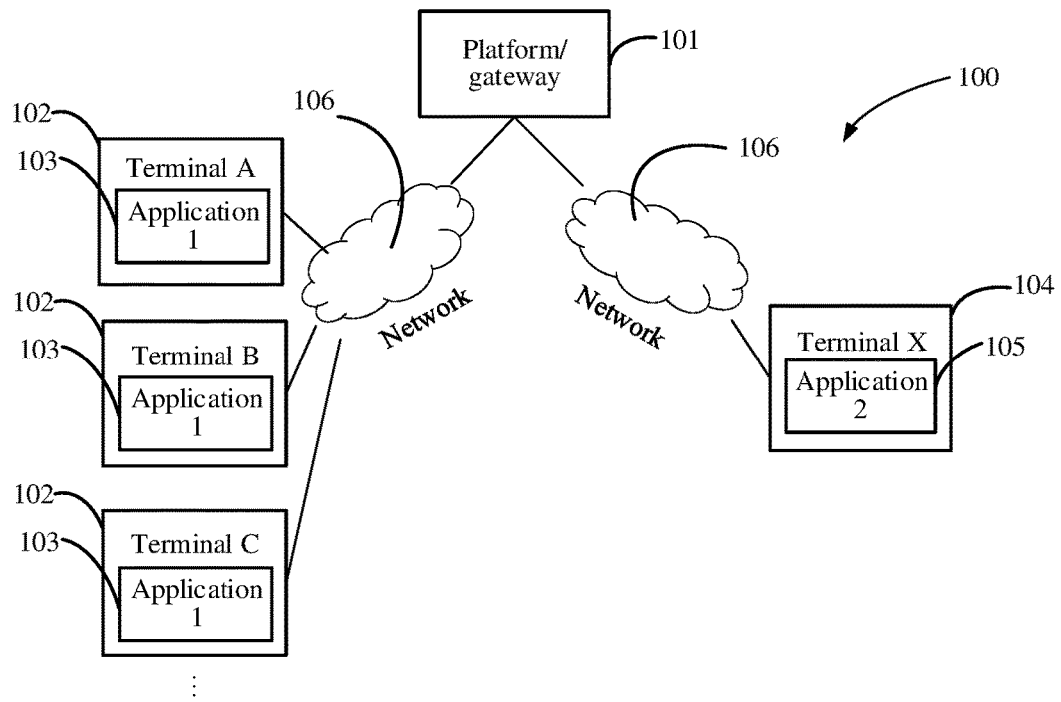
FIG. 1 is a diagram of a running architecture for acquiring a resource according to an embodiment of the present disclosure.

FIG. 1 describes a running architecture 100 for acquiring a resource according to an embodiment of the present disclosure. The running architecture 100 is based on a conventional M2M architecture, and includes a platform/gateway 101, consumer terminals 102 (such as terminals A, B, and C), and a producer terminal 104 (such as a terminal X). A consumer application 103 (such as Application 1) is installed in the consumer terminal 102, and the consumer application 103 remotely accesses the platform/gateway 101 using a network 106, and acquires, using the platform/gateway 101, data collected by a producer application 105 (such as Application 2) in the producer terminal 104. The producer application 105 is installed in the producer terminal 104, and the producer application 105 sends the collected data to the platform/gateway 101 using the network 106 such that the platform/gateway 101 provides, to the consumer application 103, the data collected by the producer application 105.

It should be noted that, in this embodiment of the present disclosure, the consumer terminals 102 in which the consumer application 103 is installed are not limited to the shown terminals A, B, and C. Actually, a quantity of consumer applications 103 may be quite huge, the data collected by the producer application 105 may be simultaneously used by consumer applications 103 in many consumer terminals 102 connected to an M2M network. The data collected by the producer application 105 is stored in the platform/gateway 101 in a resource form (briefly referred to as a producer data resource below). The producer data resource stored in the platform/gateway 101 includes a resource identifier, data content, and the like. In the other approaches, when the consumer application 103 needs to acquire the producer data resource, only a data resource acquiring request carrying the resource identifier of the producer data resource needs to be sent to the platform/gateway 101. However, because the producer application 105 does not send the collected data to the platform/gateway 101 in real time, the producer data resource acquired by the consumer application 103 is quite likely not latest. To ensure that the producer data resource acquired by the consumer application 103 is latest data collected by the producer application 105, the data resource acquiring request sent by the consumer application 103 to the platform/gateway 101 additionally carries indication information used to instruct the platform/gateway 101 to return the latest data. After receiving the data resource acquiring request sent by the consumer application 103, the platform/gateway 101 determines, based on the indication information in the data resource acquiring request, that the consumer application 103 intends to acquire the latest data collected by the producer application 105, and sends notification message to the producer application 105, where the notification message is used to notify the producer application 105 that the collected latest data that the consumer application 103 requests to acquire exists. After receiving the notification message sent by the platform/gateway 101, the producer application 105 collects the latest data, and sends the latest data to the platform/gateway 101. The platform/gateway 101 updates the producer data resource based on the received latest data, and sends a response message carrying the collected latest data to the consumer application 103.

The platform/gateway 101 may be an infrastructure node (IN) or a middle node (MN) in an M2M system, and the consumer terminal 102/producer terminal 104 may be an application service node (ASN) or an application dedicated node (ADN). Further, the consumer terminals 102 may be various mobile terminals connected to the M2M system, such as mobile phones, personal computers (PCs), and IPADs. The consumer application 103 may be any application program installed on the consumer terminal 102, such as an air thermometer application, an electricity meter application, or an intelligent transportation application. The producer terminal 104 may be, for example, various sensors, such as a temperature sensor. The consumer application 103 is any application program installed on the consumer terminal 102. The network 106 may be any medium used to make the consumer terminal 102/producer terminal 104 communicate with and connect to the platform/gateway 101, for example, any communications network such as a Local Area Network (LAN) or a Wireless LAN (WLAN).

In this embodiment of the present disclosure, the indication information used to instruct the platform/gateway 101 to return the latest data is additionally carried by the consumer application 103 in the data resource acquiring request sent to the platform/gateway 101 in order to instruct the platform/gateway 101 to acquire the collected latest data from the producer application 105, and return the collected latest data to the consumer application 103. In this embodiment of the present disclosure, when no consumer application 103 needs to acquire the latest data, the producer application 105 does not need to collect data. This avoids a waste caused by that no consumer application 103 needs the data reported by the producer application 105, reduces power consumption of the producer terminal 104, and ensures that the consumer application 103 does not obtain legacy data when needing to acquire the latest data.

Figure 2:
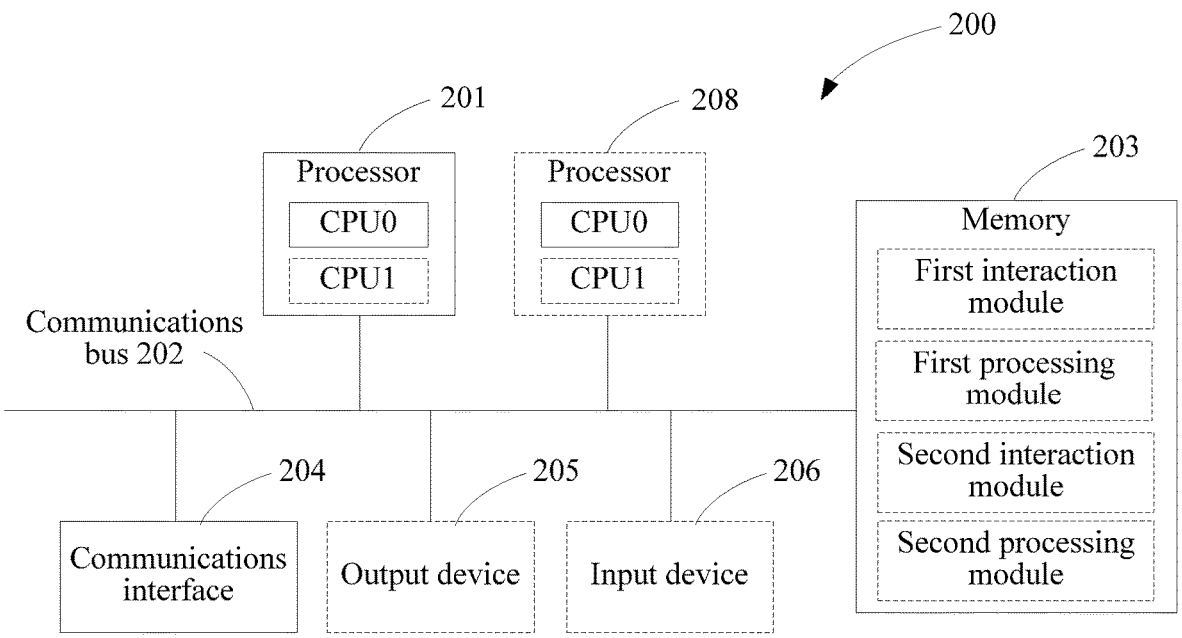
FIG. 2 is a schematic diagram of a computer device according to an embodiment of the present disclosure.

As shown in FIG. 2, the consumer terminal 102 and the platform/gateway 101 in FIG. 1 may be implemented by means of a computer device (or system) in FIG. 2.

FIG. 2 is a schematic diagram of a computer device 200 according to an embodiment of the present disclosure. The computer device 200 includes at least one processor 201, a communications bus 202, a memory 203, and at least one communications interface 204.

The processor 201 may be a general-purpose CPU, a microprocessor, an application-specific integrated circuit (ASIC), or one or more integrated circuits configured to control execution of a program of the solution of the present disclosure.

The communications bus 202 may include a path for transmitting information between the components. The communications interface 204 is applicable to any transceiver-type apparatus, and is configured to communicate with another device or a communications network such as the Ethernet, a radio access network (RAN), or a WLAN.

The memory 203 may be a read-only memory (ROM) or another type of static storage device that can store static information and a static instruction, or a random access memory (RAM) or another type of dynamic storage device that can store information and an instruction, or may be an electrically erasable programmable ROM (EEPROM), a compact disc ROM (CD-ROM) or another compact disc storage medium, optical disc storage medium (including a compact disc, a laser disc, an optical disc, a digital versatile disc (DVD), a BLU-RAY DISC, and the like) and magnetic disk storage medium, another magnetic storage device, or any other medium that can be configured to carry or store desired program code in the form of an instruction or a data structure and that is accessible to a computer, but is not limited thereto. The memory 203 may independently exist and be connected to the processor 201 using the communications bus 202. Alternatively, the memory 203 may be integrated with the processor 201.

The memory 203 is configured to store application program code for performing the solution of the present disclosure, and the execution is controlled by the processor 201. The processor 201 is configured to execute the application program code stored in the memory 203.

During specific implementation, in an embodiment, the processor 201 may include one or more CPUs, for example, a CPU 0 and a CPU 1 in FIG. 2.

During specific implementation, in an embodiment, the computer device 200 may include a plurality of processors such as the processor 201 and a processor 208 that are in FIG. 2. Each of these processors may be a single-CPU processor, or may be a multi-CPU processor. Herein the processor 201, 208 may be one or more devices, circuits, and/or processing cores configured to process data (such as a computer program instruction).

During specific implementation, in an embodiment, the computer device 200 may further include an output device 205 and an input device 206. The output device 205 communicates with the processor 201, and can display information in a plurality of manners. For example, the output device 205 may be a liquid crystal display (LCD), a light emitting diode (LED) display device, a cathode ray tube (CRT) display device, a projector, or the like. The input device 206 communicates with the processor 201, and can accept input of a user in a plurality of manners. For example, the input device 206 may be a mouse, a keyboard, a touchscreen device, a sensor device, or the like.

The computer device 200 may be a general-purpose computer device or a special-purpose computer device. During specific implementation, the computer device 200 may be a desktop computer, a portable computer, a network server, a palmtop computer, a mobile phone, a tablet computer, a wireless terminal device, a communications device, an embedded device, or a device having a structure similar to that in FIG. 2. In this embodiment of the present disclosure, a type of the computer device 200 is not limited.

The consumer terminal 102 shown in FIG. 1 may be a device shown in FIG. 2, and one or more software modules (for example, a first interaction module and a first processing module) are stored in the memory of the consumer terminal 102. The consumer terminal 102 may implement the software module using the processor and the program code in the memory in order to acquire latest producer data. One or more software modules (for example, a second interaction module and a second processing module) are stored in the memory of the platform/gateway 101. The consumer terminal 102 may implement the software module using the processor and the program code in the memory in order to acquire the latest producer data from the producer application 105, and send the latest producer data to the consumer application 103.

Based on the diagram of the running architecture 100 shown in FIG. 1, to more clearly describe a processing process in which a consumer application 103 in the running architecture 100 acquires a resource, an embodiment of the present disclosure provides a schematic flowchart of a resource acquiring method. A producer application 105 requests a platform/gateway 101 to create a subscription resource as a child resource of a producer data resource in order to instruct to send a notification message to the producer application 105 when the platform/gateway 101 creates a child resource of a preset type of the producer data resource, for example, a child resource of an acquire type. When receiving the notification message, the producer application 105 collects latest data, and sends the latest data to the platform/gateway 101. When the consumer application 103 needs to acquire the latest data collected by the producer application 105, only an acquiring request that can trigger the platform/gateway 101 to create the child resource of the preset type of the producer data resource needs to be sent to the platform/gateway 101.

Figure 3:
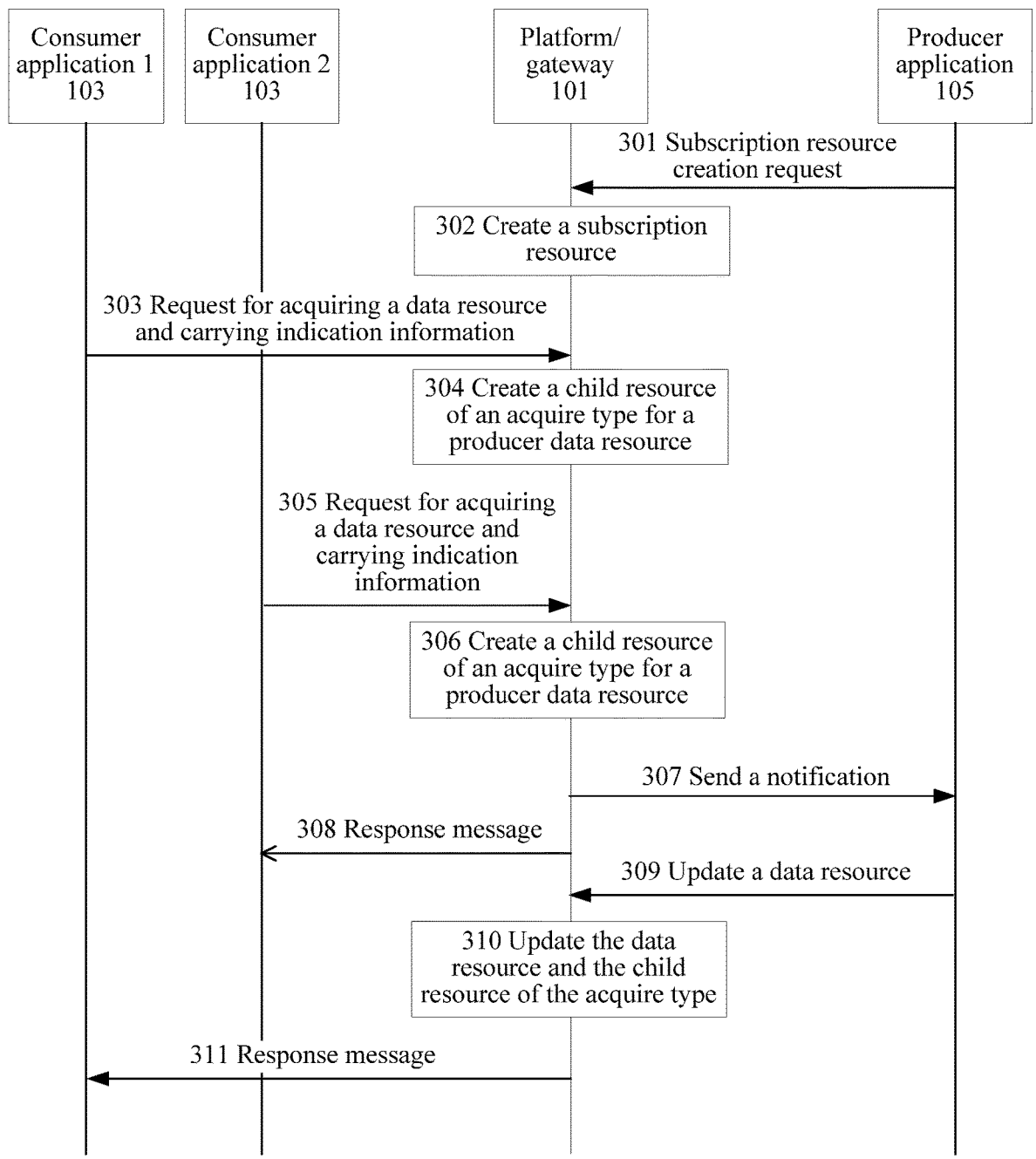
FIG. 3 is a schematic flowchart of a resource acquiring method according to an embodiment of the present disclosure.

As shown in FIG. 3, FIG. 3 is a schematic flowchart of a resource acquiring method according to an embodiment of the present disclosure. For example, in one M2M, a container resource is used as a producer data resource in which data such as a temperature value reported by a producer application 105 is stored. Moreover, a subscription resource is created for the producer data resource, and when the container resource has a change, a platform/gateway 101 sends a notification message to a corresponding subscriber based on the subscription resource. In this embodiment of the present disclosure, when a consumer application 103 attempts to acquire a latest state of the container resource, the producer application 105 receives the notification message. After the producer application 105 updates the container resource using latest data, the consumer application 103 may acquire data stored in data content in the updated container resource. In this embodiment, a one M2M standard is used as an example to perform explanations and descriptions. The producer data resource is the container resource, and the subscription resource is a subscription resource.

Step 301. The producer application 105 sends a subscription resource creation request to the platform/gateway 101, where the subscription resource creation request includes an identifier of a subscription resource, an identifier of a subscriber, and a trigger condition of a subscription event.

Further, in this embodiment of the present disclosure, the identifier of the subscription resource is an identifier of the producer data resource, that is, an identifier of the container resource, and the identifier of the subscriber is an identifier of the producer application 105. When the subscription resource has a preset change because a preset operation is performed on the subscription resource, the platform/gateway 101 is triggered to send the notification message to the subscriber. A preset operation enabling the subscription resource to have a preset change is the trigger condition of the subscription event. In this embodiment of the present disclosure, the trigger condition of the subscription event may be creating a child resource of the producer data resource, and a type of the child resource is a preset type. Optionally, the trigger condition further includes a quantity limitation of the created child resource, and/or a creation time interval limitation of a plurality of child resources.

In a possible design, the producer application 105 may send the subscription resource creation request to the platform/gateway 101 as follows:

```
POST/CSEBase/container
<m2m>
    <subscription>
        <eventType>CHILD_CREATION</eventType>
        <resourceType>ACQUIRE</resourceType>
        <batchNotify>2</batchNotify>
        <originatorID>ALL</originatorID>
        <creator>AEX</creator>
        <notificationURI>http://example.SP.AE1</notificationURI>
    </subscription>
</m2m>
```

An address "/CSEBase/container" of a POST request indicates the identifier of the subscription resource that is the identifier of the producer data resource herein. <subscription> indicates that the producer application 105 intends to create a subscription resource under the producer data resource, and eventType of the subscription resource is child creation, indicating that an interest is in only creation of a child resource, resourceType is acquire, indicating that an interest is in only a child resource of an acquire type, batchNotify is set to 2, indicating that a notification is sent only when an event is triggered at least twice, and the event herein is creation of the child resource of the acquire type, creator indicates the identifier of the subscriber that is an identifier of the consumer application 103 herein, and notificationURI indicates an address at which the subscriber receives the notification message. That is, when a resource type of the created child resource of the producer data resource is acquire, and a quantity of the child resources is greater than two, the platform/gateway 101 sends the notification message to the producer application 105, and an address for sending the notification message is http://example.SP.AE1.

In a possible design, another trigger condition of the subscription event may be further set, such as that a creation time interval of two child resources of the acquire type of the producer data resource exceeds a preset time. By setting different trigger conditions, data acquiring timeliness and power consumption of a producer terminal 104 may be well balanced. The different trigger conditions may be used together, or may be each used alone, and the trigger conditions are not limited in the present disclosure.

Step 302. The platform/gateway 101 receives the subscription resource creation request sent by the producer application 105, and creates a subscription resource, where the subscription resource is a child resource of a producer data resource.

Further, creating, by the platform/gateway 101, the subscription resource under the producer data resource based on the received subscription resource creation request is a technology well known to a person skilled in the art, and details are not described herein again.

Step 303. A consumer application 1 103 sends a request message that is used to acquire a data resource to the platform/gateway 101, where the request message that is used to acquire a data resource carries indication information instructing the platform/gateway 101 to update the producer data resource and return an updated producer data resource.

Further, the consumer application 1 103 sends a retrieve request to the platform/gateway 101 to request to retrieve the container resource, where the request carries a keepUpdate identifier. The keepUpdate identifier is transmitted using an extension header of an HTTP message.

A GET request may be as follows:
GET/CS EB ase/container
X-M2M-From: AE1
X-M2M-KEEPUPDATE: Onlyonce An address "/CSEBase/container" of the GET request indicates the identifier of the subscription resource that is the identifier of the producer data resource herein. X-M2M-From indicates an identifier of an application initiating a request that is the identifier of the consumer application 1 103 herein. An X-M2M-KEEPUPDATE identifier is used to instruct the platform/gateway 101 to update the producer data resource, and a value Onlyonce of the X-M2M-KEEPUPDATE identifier indicates that the consumer application 1 103 intends to acquire the updated producer data resource.

Step 304. The platform/gateway 101 receives the request message that is used to acquire a data resource and that is sent by the consumer application 1 103, and creates a resource of the acquire type as a child resource of the producer data resource based on the indication information in the request message.

The resource of the acquire type includes request content, a result status, and an update identifier. When the platform/gateway 101 initially creates the resource of the acquire type based on the indication information in the request message, the request content is blank, the result status is to-be-processed, and a value of the update identifier is Onlyonce. The result status is to-be-processed, indicating that the resource of the acquire type is in a to-be-processed state, the value of the update identifier is Onlyonce, indicating that the platform/gateway 101 can change the result status of the resource of the acquire type from to-be-processed to successfully processed only after the container resource is successfully updated once, and latest data of the container resource is stored in the request content of the resource of the acquire type. However, if the container resource is updated again later, latest data of the changed container resource is not updated to the request content of the resource of the acquire type again. If the container resource is updated unsuccessfully, the result status of the resource of the acquire type is changed from to-be-processed to unsuccessfully processed.

Step 305. A consumer application 2 103 sends a request message that is used to acquire a data resource to the platform/gateway 101, where the request message that is used to acquire a data resource carries indication information instructing the platform/gateway 101 to return a producer data resource and update the producer data resource.

Further, the consumer application 2 103 sends a retrieve request to the platform/gateway 101 to request to retrieve the container resource, where the request carries a keepUpdate identifier. The keepUpdate identifier is transmitted using an extension header of an HTTP message.

A GET request is as follows:
GET/CS EB ase/container
X-M2M-From: AE2
X-M2M-KEEPUPDATE: always An address "/CSEBase/container" of the GET request indicates the identifier of the subscription resource that is the identifier of the producer data resource herein. X-M2M-From indicates an identifier of an application initiating a request that is the identifier of the consumer application 2 103 herein. An X-M2M-KEEPUPDATE identifier is used to instruct the platform/gateway 101 to update the producer data resource, and a value always of the X-M2M-KEEPUPDATE identifier indicates that the consumer application 2 103 intends to acquire the current producer data resource.

Step 306. The platform/gateway 101 receives the request message that is used to acquire a data resource and that is sent by the consumer application 2 103, and creates a resource of the acquire type as a child resource of the producer data resource based on the indication information in the request message.

The resource of the acquire type includes request content, a result status, and an update identifier. When the platform/gateway 101 initially creates the resource of the acquire type based on the indication information in the request message, the request content is blank, the result status is to-be-processed, and a value of the update identifier is always. The value of the update identifier is always, indicating that the platform/gateway 101 does not need to wait for the container resource to be updated, but directly acquires a current value in data content of the producer data resource and stores the current value in the request content, and then directly changes the result status of the resource of the acquire type from to-be-processed to successfully processed.

Step 307. The platform/gateway 101 sends a notification message to the producer application 105, where the notification message is used to indicate that a consumer application needs to acquire current moment data.

Further, when the subscription resource has a preset change, the platform/gateway 101 sends the notification message to the subscriber. In this embodiment of the present disclosure, according to the example in step 301, a trigger condition of the subscription event is that at least two child resources of the acquire type are created under the producer data resource. After step 304 and step 306 are performed, two child resources of the acquire type are created under the producer data resource. Therefore, in this case, the platform/gateway 101 is triggered to send the notification message to the producer application 105.

Step 308. The platform/gateway 101 sends a response message to the consumer application 2 103, where the response message carries the current value in the data content of the producer data resource.

It should be noted that, a sequence of step 307 and step 308 is not limited. Because in step 305, the indication information carried in the request message sent by the consumer application 2 to the platform/gateway 101 instructs the platform/gateway 101 to return the current producer data resource and update the producer data resource, the platform/gateway 101 does not need to wait for the producer application 105 to return latest data, but directly acquires the current data stored in the data content of the producer data resource and returns the current data to the consumer application 2. Optionally, the data stored in the data content of the producer data resource may be acquired by the platform/gateway 101 from the data content in the producer data resource, or may be acquired from the request content of the resource of the acquire type created in step 306.

Step 309. The producer application 105 acquires latest data, and sends an update request to the platform/gateway 101, where the update request includes the acquired latest data.

Optionally, the platform/gateway 101 determines, based on the received notification message, that the container resource needs to be updated. Therefore, the latest data is acquired. For example, a current temperature value is collected. Then, the update request is sent to the platform/gateway 101 to request to update the container resource, where the update request carries the acquired latest data.

Step 310. The platform/gateway 101 receives the update request sent by the producer application 105, and updates the producer data resource based on the update request.

Further, the platform/gateway 101 updates the data content in the container resource based on the latest data carried in the update request sent by the producer application 105.

Optionally, the platform/gateway 101 further determines, one by one, whether child resources of the acquire type under the container resource need to be updated. Further, the platform/gateway 101 determines, one by one, whether result statuses of the child resources of the acquire type under the container resource are a to-be-processed state, and when the result statuses are the to-be-processed state, updates corresponding request content of the child resources of the acquire type based on latest data carried in the update request, and changes the result statuses to successfully processed.

Step 311. The platform/gateway 101 sends a response message to the consumer application 1 103, where the response message carries the latest data returned by the producer application 105.

Optionally, the latest data that is returned by the producer application 105 and that is carried in the response message may be acquired by the platform/gateway 101 from the data content in the updated producer data resource in step 310, or may be acquired from the request content of the updated resource of the acquire type.

In a possible design, each time a same consumer application sends a request message that is used to acquire a data resource to the platform/gateway 101, the platform/gateway 101 creates a new child resource of an acquire type. To alleviate processing load of the platform/gateway 101, the platform/gateway 101 deletes the created resource of the acquire type according to a rule. For example, each resource of the acquire type has a life cycle starting from creation of the resource of the acquire type, and when an existence time of a resource of the acquire type exceeds the life cycle, the platform/gateway 101 deletes the resource of the acquire type, when a result status of a resource of the acquire type is unsuccessfully processed or processed, the platform/gateway 101 deletes the resource of the acquire type, or when an update identifier of a resource of the acquire type is always and a result status is unsuccessfully processed or processed, the platform/gateway 101 deletes the resource of the acquire type.

In a possible design, the data content of the producer data resource always stores the latest data received from the producer application 105, and the request content of the resource of the acquire type may store historical data generated by the producer application 105, such as the resource of the acquire type whose update identifier is Onlyonce in the foregoing embodiment. The platform/gateway 101 further receives a request message that is used to acquire a data resource and that is sent by the consumer application 103, where the request message that is used to acquire a data resource carries an identifier of the resource of the acquire type created in the foregoing step, and the platform/gateway 101 acquires, based on the identifier of the child resource of the acquire type, the data stored in the request content of the resource of the acquire type, and returns the data to the consumer application 103.

In this embodiment of the present disclosure, when the platform/gateway 101 receives the request message that is used to acquire the producer data resource and that is sent by the consumer application 103, different from the other approaches, instead of directly acquiring data content in the producer data resource and directly feeding back the data content to the consumer application 103, the platform/gateway 101 performs a preset operation on the producer data resource to trigger the platform/gateway 101 to send, to the producer application 105, the notification message for acquiring the latest data. After receiving the notification message sent by the platform/gateway 101, the producer application 105 acquires the latest data, and sends the update request to the platform/gateway 101 such that the platform/gateway 101 updates the producer data resource, and returns the latest data to the consumer application 103. By means of the method in this embodiment of the present disclosure, the producer application 105 updates the producer data resource based on a request of the consumer application 103 for the producer data resource as required in order to prevent the producer application 105 from frequently and unnecessarily updating the producer data resource, and resolve a problem of mismatching between data generated by the producer application 105 and data used by the consumer application 103.

Figure 4:
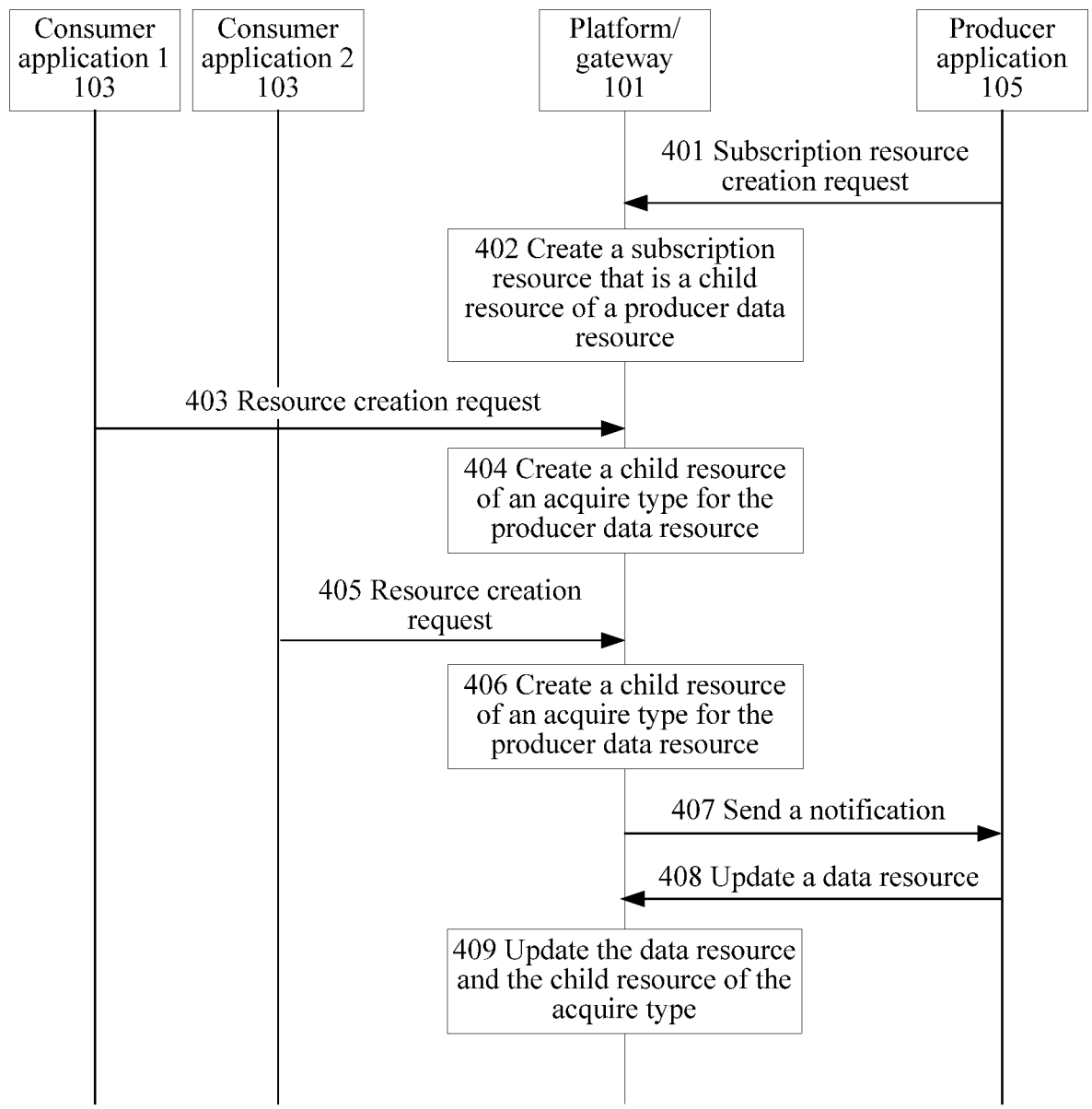
FIG. 4 is a schematic flowchart of another resource acquiring method according to an embodiment of the present disclosure.

FIG. 4 is a schematic flowchart of another resource acquiring method according to an embodiment of the present disclosure. As shown in FIG. 4, the method includes the following steps.

Step 401 and step 402 are the same as step 301 and step 302 in the embodiment shown in FIG. 3. Step 404, step 406, step 407, step 408, and step 409 are respectively the same as step 304, step 306, step 307, step 309, and step 310 in the embodiment shown in FIG. 3. For related descriptions, refer to the foregoing steps. Details are not described herein again.

Step 403. A consumer application 1 103 sends a resource creation request to a platform/gateway 101, where the resource creation request is used to instruct the platform/ gateway 101 to create a child resource of a producer data resource, and includes an identifier of the producer data resource, a type of a resource that needs to be created, and content of a resource that needs to be created.

Further, the resource creation request may be as follows:

```
POST/CSEBase/container
X-M2M-From: AE1
Content-Type: application/vnd.onem2m-res+xml; resourceType=ACQUIRE
<m2m>
    <acquire>
        <request>BLANK</request>
        <keepUpdate>Onlyonce</keepUpdate>
    </acquire>
</m2m>
```

An address "/CSEBase/container" of a POST request indicates the identifier of the producer data resource. X-M2M-From indicates an identifier of an application initiating a request that is the identifier of the consumer application 103 herein. resourceType=ACQUIRE indicates that a type of a resource that needs to be created is an ACQUIRE type. An X-M2M-KEEPUPDATE identifier is used to instruct the platform/gateway 101 to update the producer data resource, and a value Onlyonce of the X-M2M-KEEPUPDATE identifier indicates that the consumer application 1 103 intends to acquire the updated producer data resource. Content between two <acquire> identifiers is content of a resource that needs to be created, and includes request content and an update identifier. BLANK indicates that the request content is blank when the resource is just created, Onlyonce indicates that a value of the update identifier keepUpdate is Onlyonce, the value of the update identifier is Onlyonce, indicating that after creating the resource of the ACQUIRE type, the platform/gateway 101 can change the result status of the resource of the acquire type from to-be-processed to successfully processed only after the container resource is successfully updated once, and latest data of the container resource is stored in the request content of the resource of the acquire type. However, if the container resource is updated again later, latest data of the changed container resource is not updated to the request content of the resource of the acquire type again.

Step 405. A consumer application 2 103 sends a resource creation request to a platform/gateway 101, where the resource creation request is used to instruct the platform/ gateway 101 to create a child resource of a producer data resource, and includes an identifier of the producer data resource, a type of a resource that needs to be created, and content of a resource that needs to be created.

Further, the resource creation request may be as follows:

```
POST/CSEBase/container
X-M2M-From: AE2
Content-Type: application/vnd.onem2m-res+xml; resourceType=ACQUIRE
<m2m>
    <acquire>
        <request>BLANK</request>
        <keepUpdate>always</keepUpdate>
    </acquire>
</m2m>
```

The resource creation request is different from a resource creation request in step 403 in that an update identifier in the resource creation request is always. The value of the update identifier is always, indicating that after creating a resource, the platform/gateway 101 does not need to wait for the container resource to be updated, but directly acquires a current value of data content of the producer data resource and stores the current value in the request content, and then directly changes the result status of the resource of the acquire type from to-be-processed to successfully processed.

It should be noted that, different from the embodiment shown in FIG. 3, in this embodiment of the present disclosure, the platform/gateway 101 does not actively send data updated by a producer application to a consumer application. When a consumer application needs to acquire latest data, the consumer application needs to actively acquire the request content in the resource of the acquire type or the data content in the producer data resource. A process of active acquiring is a technology well known to a person skilled in the art, and details are not described herein again.

Figure 5:
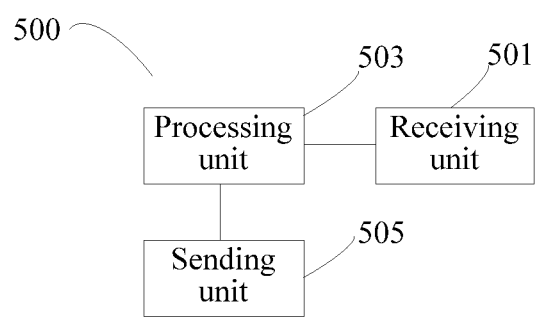
FIG. 5 is a schematic structural diagram of a data resource platform according to an embodiment of the present disclosure.

An embodiment of the present disclosure further describes a schematic structural diagram of a data resource platform belonging to a same inventive idea as that of the method embodiment described in FIG. 3. As shown in FIG. 5, the data resource platform 500 is configured to perform functions of the platform/gateway 101 in the method embodiment described in FIG. 3, and includes a receiving unit 501, a processing unit 503, and a sending unit 505.

The receiving unit 501 is configured to receive a request message that is used to acquire a producer data resource and that is sent by a consumer application, where the request message carries indication information that is used to instruct to update the producer data resource and return an updated producer data resource. The processing unit 503 is configured to acquire current moment data from a producer application, and update the producer data resource using the current moment data. The sending unit 505 is configured to return the updated producer data resource to the consumer application.

Optionally, before receiving the request message that is used to acquire the producer data resource and that is sent by the consumer application, the receiving unit 501 is further configured to receive a subscription resource creation request sent by the producer application, where the subscription resource creation request includes an identifier of the producer data resource, an identifier of the producer application, and a trigger condition of a subscription event. The processing unit 503 is further configured to create a subscription resource based on the subscription resource creation request.

In a possible implementation, acquiring, by the processing unit, current moment data from the producer application, and updating the producer data resource using the current moment data includes performing a preset operation on the producer data resource based on the indication information, determining that the preset operation satisfies the trigger condition, sending a notification message to the producer application based on the identifier of the producer application, where the notification message is used to indicate that a consumer application needs to acquire the current moment data, receiving the current moment data returned by the producer application, and updating the producer data resource using the current moment data returned by the producer application.

The trigger condition includes creating a child resource of the producer data resource, and a type of the child resource is a preset type, and/or a quantity limitation of the created child resource, and/or a creation time interval limitation of a plurality of child resources.

Further, the child resource includes a result status and request content, and after the sending unit 505 updates the producer data resource using the current moment data returned by the producer application, the processing unit 503 is further configured to change the result status from a to-be-processed state to a successfully processed state, and update the request content using the current moment data.

In this embodiment, the data resource platform 500 is presented in a form of a functional unit. The "unit" herein may be an ASIC, a circuit, a processor for executing one or more software or firmware programs, a memory, an integrated logic circuit, and/or another device that can provide the foregoing functions. In a simple embodiment, a person skilled in the art may conceive that the data resource platform 500 may be of the form shown in FIG. 2. The receiving unit 501, the processing unit 503, and the sending unit 505 may be implemented using the processor and the memory in FIG. 3. Further, the receiving unit 501 and the sending unit 505 may be implemented by executing a first interaction module by the processor, and the processing unit 503 may be implemented by executing a first processing module by the processor.

Figure 6:
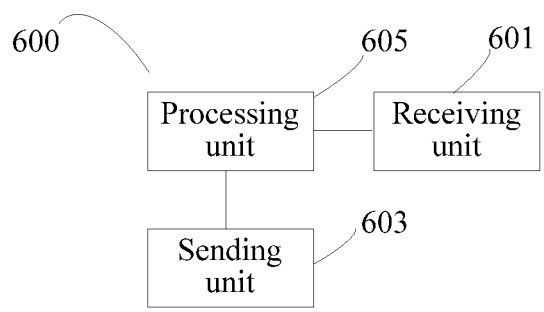
FIG. 6 is a schematic structural diagram of another data resource platform according to an embodiment of the present disclosure.

An embodiment of the present disclosure further describes a schematic structural diagram of a data resource platform belonging to a same inventive idea as that of the method embodiment described in FIG. 3. As shown in FIG. 6, the data resource platform 600 is configured to perform functions of the platform/gateway 101 in the method embodiment described in FIG. 3, and includes a receiving unit 601, a processing unit 605, and a sending unit 603.

The receiving unit 601 is configured to receive a request message that is used to acquire a producer data resource and that is sent by a consumer application, where the request message carries an indication message that is used to instruct to return the producer data resource and update the producer data resource. The sending unit 603 is configured to return the producer data resource to the consumer application. The processing unit 605 is configured to acquire current moment data from a producer application, and update the producer data resource using the current moment data.

Optionally, before receiving the request message that is used to acquire the producer data resource and that is sent by the consumer application, the receiving unit 601 is further configured to receive a subscription resource creation request sent by the producer application, where the subscription resource creation request includes an identifier of the producer data resource, an identifier of the producer application, and a trigger condition of a subscription event. The processing unit 605 is further configured to create a subscription resource based on the subscription resource creation request.

In a possible implementation, acquiring, by the processing unit 605, current moment data from the producer application, and updating the producer data resource using the current moment data includes performing a preset operation on the producer data resource based on the indication message, determining that the preset operation satisfies the trigger condition, sending a notification message to the producer application based on the identifier of the producer application, where the notification message is used to indicate that a consumer application needs to acquire the current moment data, receiving the current moment data returned by the producer application, and updating the producer data resource using the current moment data returned by the producer application. The trigger condition includes creating a child resource of the producer data resource, and a type of the child resource is a preset type, and/or a quantity limitation of the created child resource, and/or a creation time interval limitation of a plurality of child resources.

In this embodiment, the data resource platform 600 is presented in a form of a functional unit. The "unit" herein may be an ASIC, a circuit, a processor for executing one or more software or firmware programs, a memory, an integrated logic circuit, and/or another device that can provide the foregoing functions. In a simple embodiment, a person skilled in the art may conceive that the data resource platform 600 may be of the form shown in FIG. 2. The receiving unit 601, the sending unit 603, and the processing unit 605 may be implemented using the processor and the memory in FIG. 2. Further, the receiving unit 601 and the sending unit 603 may be implemented by executing a second interaction module by the processor, and the processing unit 605 may be implemented by executing a second processing module by the processor.

An embodiment of the present disclosure further provides a computer storage medium configured to store a computer software instruction used by a data resource platform, and the computer storage medium includes a program that is designed for performing the foregoing method embodiments. By executing the stored program, a method for acquiring a data resource may be implemented.

Although the present disclosure is described with reference to the embodiments, in a process of implementing the present disclosure that claims protection, a person skilled in the art may understand and implement another variation of the disclosed embodiments by viewing the accompanying drawings, disclosed content, and the accompanying claims. In the claims, "comprising" (comprising) does not exclude another component or another step, and "a" or "one" does not exclude a case of multiple. A single processor or another unit may implement several functions enumerated in the claims. The fact that certain measures are recited in mutually different dependent claims does not indicate that a combination of these measures cannot bring better effects.

A person skilled in the art should understand that the embodiments of the present disclosure may be provided as a method, an apparatus (device), or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a CD-ROM, an optical memory, and the like) that include computer-usable program code. The computer program is stored/distributed in a proper medium and is provided as or used as a part of the hardware together with another hardware, or may use another distribution form such as using the Internet or another wired or wireless telecommunications system.

The present disclosure is described with reference to the flowcharts and/or block diagrams of the method, the apparatus (device), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine such that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner such that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device such that a series of operations and steps are performed on the computer or the other programmable device, thereby generating computer-implemented processing. Therefore, the instructions executed on the computer or the other programmable device provides steps for implementing a specific function in one or more processes in the flowcharts and/or in one or more blocks in the block diagrams.

Although the present disclosure is described with reference to specific features and the embodiments thereof, obviously, various modifications and combinations may be made to them without departing from the spirit and scope of the present disclosure. Correspondingly, the specification and the accompanying drawings are merely examples of descriptions of the present disclosure defined by the appended claims, and are considered as any of or all modifications, variations, combinations, or equivalents that cover the scope of the present disclosure. Obviously, a person skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:

1. A resource acquiring method, comprising:
receiving, by a data resource platform, a subscription resource creation request from a producer application;
creating, by the data resource platform, a subscription resource based on the subscription resource creation request, wherein the subscription resource creation request requests the data resource platform to create the subscription resource such that the data resource platform notifies the producer application when a consumer application needs to acquire current moment data;
receiving, by a data resource platform, a request message from the consumer application for acquiring a producer data resource generated by the producer application, wherein the request message carries indication information instructing the data resource platform to update the producer data resource and return an updated producer data resource;
sending, by the data resource platform, a notification message to the producer application after receiving the request message, wherein the notification message notifies the producer application that the consumer application intends to acquire the current moment data;
acquiring, by the data resource platform, the current moment data from the producer application, wherein the current moment data comprises the latest producer data resource collected by the producer application in response to the notification message;

updating, by the data resource platform, the producer data resource using the current moment data to generate the updated producer data resource; and returning, by the data resource platform, the updated producer data resource to the consumer application.

2. The method of claim 1, wherein the subscription resource creation request comprises an identifier of the producer data resource, an identifier of the producer application, and a trigger condition of a subscription event.

3. The method of claim 2, further comprising:
performing a preset operation on the producer data resource based on the indication information; and
sending the notification message to the producer application based on the identifier of the producer application when the performed preset operation satisfies the trigger condition.

4. The method of claim 2, wherein the trigger condition comprises creating a child resource of the producer data resource, and wherein a type of the child resource comprises a preset type.

5. The method of claim 4, wherein the trigger condition further comprises a quantity limitation of the created child resource and a creation time interval limitation of a plurality of child resources.

6. The method of claim 4, wherein the trigger condition further comprises a quantity limitation of the created child resource.

7. The method of claim 4, wherein the trigger condition further comprises a creation time interval limitation of a plurality of child resources.

8. The method of claim 4, wherein the child resource comprises a result status and request content, and wherein after updating the producer data resource using the current moment data from the producer application, the method further comprises:
changing the result status from a to-be-processed state to a successfully processed state; and
updating the request content using the current moment data.

9. A resource acquiring method, comprising:
sending, by a producer application, a subscription resource creation request to a data resource platform, wherein the subscription resource creation request requests the data resource platform to notify the producer application when a consumer application needs to acquire current moment data;
receiving, by the producer application, a notification message from the data resource platform, wherein the notification message indicates that the data resource platform has received a request message from the consumer application for acquiring a producer data resource generated by the producer application, and wherein the request message carries an indication message instructing the data resource platform to return the producer data resource and update the producer data resource;
acquiring, by the producer application, current moment data comprising the latest producer data resource collected by the producer application in response to the notification message, wherein the producer application collects the latest producer resource when the notification message indicates that the consumer application needs to acquire the latest producer data resource collected by the producer application; and
sending, by the producer application, the current moment data to the data resource platform, wherein the current moment data is for updating the producer data resource.

10. The method of claim 9, wherein the subscription resource creation request comprises an identifier of the producer data resource, an identifier of the producer application, and a trigger condition of a subscription event from the producer application, and wherein the subscription resource creation request is for creating a subscription resource.

11. The method of claim 10, wherein the data resource platform comprises an infrastructure node (IN) or a middle node (MN) in a machine-to-machine (M2M) system, wherein the consumer application comprises an application service node (ASN) or an application dedicated node (ADN) in the M2M system, and wherein the producer application comprises a second ASN or a second ADN in the M2M system.

12. The method of claim 10, wherein the trigger condition comprises creating a child resource of the producer data resource, and wherein a type of the child resource comprises a preset type.

13. A data resource platform, comprising:
a memory storing a computer readable program; and
a processor coupled to the memory, the computer readable program causing the processor to be configured to:
receive a subscription resource creation request from a producer application;
create a subscription resource based on the subscription resource creation request, wherein the subscription resource creation request requests the data resource platform to create the subscription resource such that the data resource platform notifies the producer application when a consumer application needs to acquire current moment data;
receive a request message from the consumer application for acquiring a producer data resource generated by the producer application, wherein the request message carries indication information instructing the data resource platform to update the producer data resource and return an updated producer data resource;
send a notification message to the producer application after receiving the request message, wherein the notification message notifies the producer application that the consumer application intends to acquire current moment data;
acquire the current moment data from the producer application, wherein the current moment data comprises the latest producer data resource collected by the producer application in response to the notification message;
update the producer data resource using the current moment data to generate the updated producer data resource; and
return the updated producer data resource to the consumer application.

14. The data resource platform of claim 13, wherein the subscription resource creation request comprises an identifier of the producer data resource, an identifier of the producer application, and a trigger condition of a subscription event from the producer application.

15. The data resource platform of claim 14, wherein when acquiring the current moment data and updating the producer data resource using the current moment data, the computer readable program causes the processor to be configured to:
perform a preset operation on the producer data resource based on the indication information; and send the notification message to the producer application based on the identifier of the producer application when the performed preset operation satisfies the trigger condition.

16. The data resource platform of claim 14, wherein the trigger condition comprises creating a child resource of the producer data resource, and wherein a type of the child resource comprising a preset type.

17. The data resource platform of claim 16, wherein the trigger condition further comprises a quantity limitation of the created child resource and a creation time interval limitation of a plurality of child resources.

18. The data resource platform of claim 16, wherein the trigger condition further comprises a quantity limitation of the created child resource.

19. The data resource platform of claim 16, wherein the trigger condition further comprises a creation time interval limitation of a plurality of child resources.

20. The data resource platform of claim 16, wherein the child resource comprises a result status and request content, and wherein after updating the producer data resource using the current moment data from the producer application, the computer readable program causes the processor to be configured to:
    change the result status from a to-be-processed state to a successfully processed state; and
    update the request content using the current moment data.

* * * * *